United States Patent
Tomoi et al.

(10) Patent No.: US 9,969,217 B2
(45) Date of Patent: May 15, 2018

(54) LAMINATED BODY AND PNEUMATIC TYRE USING SAME

(71) Applicant: The Yokohama Rubber Co., Ltd., Tokyo (JP)

(72) Inventors: Shusaku Tomoi, Hiratsuka (JP); Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 200 days.

(21) Appl. No.: 15/000,402

(22) Filed: Jan. 19, 2016

(65) Prior Publication Data

US 2016/0136999 A1 May 19, 2016

Related U.S. Application Data

(62) Division of application No. 13/810,090, filed as application No. PCT/JP2011/057493 on Mar. 18, 2011, now Pat. No. 9,272,491.

(30) Foreign Application Priority Data

Jul. 15, 2010 (JP) ................................. 2010-160521

(51) Int. Cl.
| | |
|---|---|
| *B60C 5/14* | (2006.01) |
| *B60C 5/00* | (2006.01) |
| *B32B 25/08* | (2006.01) |
| *B32B 25/14* | (2006.01) |
| *B32B 7/02* | (2006.01) |
| *B32B 27/08* | (2006.01) |
| *B32B 27/34* | (2006.01) |
| *B32B 27/28* | (2006.01) |
| *B32B 27/30* | (2006.01) |

(52) U.S. Cl.
CPC ................ *B60C 5/14* (2013.01); *B32B 7/02* (2013.01); *B32B 25/08* (2013.01); *B32B 25/14* (2013.01); *B32B 27/08* (2013.01); *B32B 27/28* (2013.01); *B32B 27/306* (2013.01); *B32B 27/34* (2013.01); *B60C 5/00* (2013.01); *B32B 2250/42* (2013.01); *B32B 2270/00* (2013.01); *B32B 2597/00* (2013.01); *B60C 2005/145* (2013.01); *Y10T 428/2495* (2015.01); *Y10T 428/3192* (2015.04)

(58) Field of Classification Search
None
See application file for complete search history.

(56) References Cited

U.S. PATENT DOCUMENTS

| | | | |
|---|---|---|---|
| 5,040,583 A | 8/1991 | Lin et al. | |
| 5,055,355 A | 10/1991 | DeAntonis et al. | |
| 6,207,754 B1 | 3/2001 | Yu | |
| 6,376,598 B1 | 4/2002 | Wang | |
| 9,272,491 B2 * | 3/2016 | Tomoi | B32B 27/28 |
| 2004/0089388 A1 * | 5/2004 | Fujino | B60C 1/0008 152/510 |
| 2008/0124523 A1 | 5/2008 | Nohara et al. | |
| 2008/0314490 A1 | 12/2008 | Morooka | |
| 2009/0065118 A1 | 3/2009 | Morooka | |
| 2010/0147432 A1 | 6/2010 | Morooka | |
| 2011/0028648 A1 | 2/2011 | Kawaguchi et al. | |

FOREIGN PATENT DOCUMENTS

| | | |
|---|---|---|
| EP | 1995079 A1 | 11/2008 |
| EP | 2060411 A1 | 5/2009 |
| EP | 2151331 A1 | 2/2010 |
| JP | 01-314164 A | 12/1989 |
| JP | H02-035291 A | 2/1990 |
| JP | 6-040207 A | 2/1994 |
| JP | H06-40207 A | 2/1994 |
| JP | 2001-151972 A | 6/2001 |
| JP | 2002-079804 A | 3/2002 |
| JP | 2004-176048 A | 6/2004 |
| JP | 2005-343217 A | 12/2005 |
| JP | 2006-167919 A | 6/2006 |
| WO | WO-2006/059621 A1 | 6/2006 |
| WO | WO-2007/083785 A1 | 7/2007 |
| WO | WO-2007/100159 A1 | 9/2007 |
| WO | WO-2007123220 A1 | 11/2007 |
| WO | WO-2009/116308 A1 | 9/2009 |

OTHER PUBLICATIONS

Office Action dated Sep. 2, 2014 in Japanese Patent Application No. 2010-160521.
Extended European Search Report dated Apr. 2, 2014 in counterpart European Application No. 11806516.8.

* cited by examiner

*Primary Examiner* — Sheeba Ahmed
(74) *Attorney, Agent, or Firm* — Polsinelli PC

(57) ABSTRACT

A laminate comprising at least one layer of a first thermoplastic resin composition alternately stacked with at least two layers of a second thermoplastic resin composition so that the outermost layers are the layers of the second thermoplastic resin composition, wherein the first thermoplastic resin composition comprises at least one selected from the group consisting of ethylene-vinyl alcohol copolymer and modified ethylene-vinyl alcohol copolymers, and the second thermoplastic resin composition has a different composition from the first thermoplastic resin composition, and wherein, in any adjacent pair of the layer of the first thermoplastic resin composition and the layer of the second thermoplastic resin composition, the layer of the first thermoplastic resin composition and the layer of the second thermoplastic resin composition have a specific tensile modulus ratio and a specific thickness ratio.

15 Claims, No Drawings

LAMINATED BODY AND PNEUMATIC TYRE USING SAME

CROSS REFERENCE TO RELATED APPLICATIONS

This application is a Divisional of U.S. patent application Ser. No. 13/810,090 filed on Jan. 14, 2013, which is a National Phase filing under 35 U.S.C. § 371 of PCT/JP2011/057493 filed on Mar. 18, 2011; and this application claims priority to Application No. 2010-160521 filed in Japan on Jul. 15, 2010 under 35 U.S.C. § 119; the entire contents of all are hereby incorporated by reference.

TECHNICAL FIELD

The present invention relates to a laminate and a pneumatic tire using the same, and more specifically, it relates to a laminate having excellent gas permeation preventing properties and fatigue durability, and a pneumatic tire using the laminate in an inner liner.

BACKGROUND ART

Weight reduction of gas permeation preventing structures used in applications which require the prevention of gas permeation (for example, pneumatic tires, gas or fluid transporting hoses, etc.) has heretofore been desired. Generally, the amount of gas (for example, air) that passes through a layer of a thermoplastic resin composition or rubber composition decreases with the increase in the thickness of that layer. However, since the weight of the layer increases with the increase in the thickness of the layer, in applications, such as pneumatic tires, in which weight reduction is required in order to improve fuel efficiency, there have been many proposals for reducing the weights of the gas permeation preventing structures by using a material having high gas barrier properties (i.e., a material having a low gas permeation coefficient). For example, using a laminate comprising a gas permeation preventing layer comprising a thermoplastic resin such as ethylene-vinyl alcohol copolymer (EVOH), which is known to have excellent gas barrier properties and an elastic surface layer or adhesive layer comprising a rubber or thermoplastic elastomer, etc., as an inner liner provided on the inner surface of a pneumatic tire to retain the inner pressure of the pneumatic tire is proposed in, for example, Japanese Unexamined Patent Publication (JP-A) No. 1-314164, Japanese Unexamined Patent Publication (JP-A) No. 6-40207, WO 2007/083785, WO 2007/100159, and WO 2007/123220.

However, when an EVOH-containing layer is applied to the inner surface of a tire as a laminate with another layer having a low elastic modulus, such as a rubber layer, as proposed in the above patent documents, or when an EVOH-containing layer is directly applied to the inner surface of a tire, since EVOH has a significantly higher elastic modulus compared to rubber usually used in pneumatic tires, excessive stresses due to repeated flex and tensile deformations during tire running are applied to the EVOH-containing layer, and as a result, cracks may occur in the EVOH-containing layer. The more the EVOH-containing layer tends to generate cracks, the less the fatigue durability, and therefore the less the air pressure retaining properties.

Accordingly, in the laminate comprising an EVOH-containing layer, it is necessary to have well balanced gas permeation preventing properties and fatigue durability (consequently air pressure retaining properties) by preventing the cracking of the EVOH-containing layer from occurring.

PRIOR ART DOCUMENTS

Patent Documents

Patent Document 1: Japanese Unexamined Patent Publication No. 1-314164
Patent Document 2: Japanese Unexamined Patent Publication No. 6-40207
Patent Document 3: WO 2007/083785
Patent Document 4: WO 2007/100159
Patent Document 5: WO 2007/123220

SUMMARY OF THE INVENTION

Problems to be Solved by the Invention

Therefore, the object of the present invention is to provide a laminate comprising an EVOH-containing layer, useful as a gas permeation preventing structure, which makes it possible to achieve well balanced gas permeation preventing properties and fatigue durability (consequently air pressure retaining properties) by preventing the cracking of the EVOH-containing layer from occurring.

Means to Solve the Problems

The inventors have made extensive studies to overcome the above problems, and found that, in a laminate comprising at least one EVOH layer (a first thermoplastic resin composition) alternately stacked with layers of a thermoplastic resin composition (a second thermoplastic resin composition) having a different composition from the EVOH-containing layer, the stress applied to the EVOH-containing layer or layers is reduced by making the tensile modulus ratio more than 1 and up to 10, and making the thickness of the layer of the second thermoplastic resin composition equal to or more than the thickness of the adjacent EVOH-containing layer, in any adjacent pair of the EVOH-containing layer and the layer of the second thermoplastic resin composition, and makes it possible to prevent the cracking in the EVOH layer or layers from occurring, and have completed the present invention.

According to the present invention, a laminate comprising at least one layer of a first thermoplastic resin composition alternately stacked with at least two layers of a second thermoplastic resin composition so that the outermost layers are the layers of the second thermoplastic resin composition, wherein the first thermoplastic resin composition comprises at least one selected from the group consisting of ethylene-vinyl alcohol copolymer and modified ethylene-vinyl alcohol copolymers, and the second thermoplastic resin composition has a different composition from the first thermoplastic resin composition, and wherein, in any adjacent pair of the layer of the first thermoplastic resin composition and the layer of the second thermoplastic resin composition, the ratio $E_1/E_2$ is more than 1 and up to 10, and the ratio $t_1/t_2$ is 0.1 or more and up to 1, wherein $E_1$ and $t_1$ are the tensile modulus and thickness of the layer of the first thermoplastic resin composition and $E_2$ and $t_2$ are the tensile modulus and thickness of the layer of the second thermoplastic resin composition is provided.

A pneumatic tire using the laminate in an inner liner is also provided.

MODE FOR CARRYING OUT THE INVENTION

The laminate of the present invention comprises at least one layer of a first thermoplastic resin composition (hereinafter also referred to as "a layer or layers of the first composition") alternately stacked with at least two layers of a second thermoplastic resin composition (hereinafter also referred to as "layers of the second composition") so that the outermost layers are the layers of the second composition, as described above. Accordingly, when the number of layers of the first composition is n (wherein n is an integer of 1 or more), the number of the layers of the second composition that constitute the laminate of the present invention is n+1. For example, when the number of layers of the first composition that constitute the laminate of the present invention is 1, a layer of the second composition is laminated onto each side surface of the layer of the first composition so as to sandwich the layer of the first composition, and the total number of the layers of the second composition is 2.

The laminate of the present invention is characterized in that, in any adjacent pair of a layer of the first composition and a layer of the second composition in the layer or layers of the first composition and the layers of the second composition stacked in such an order, the tensile modulus ratio $E_1/E_2$ is more than 1 and up to 10, and the thickness ratio $t_1/t_2$ is 0.1 or more and up to 1, wherein $E_1$ and $t_1$ are the tensile modulus and thickness of the layer of the first composition, and $E_2$ and $t_2$ are the tensile modulus and thickness of the layer of the second composition. Namely, when the laminate of the present invention is comprised of n layer or layers of the first composition alternately stacked with n+1 layers of the second composition, if one of the outermost layers is referred to as the first layer of the second composition and the layer of the first composition adjacent to the first layer of the second composition is referred to as the first layer of the first composition, and if the tensile modulus and thickness of the kth layer (wherein k is an integer of 1 to n) of the first composition from the first layer of the first composition are respectively represented as $E_{1(k)}$ and $t_{1(k)}$, and the tensile modulus and thickness of the kth layer of the second composition (adjacent to the kth layer of the first composition) from the first layer of the second composition are respectively represented as $E_{2(k)}$ and $t_{2(k)}$, the ratio $E_{1(k)}/E_{2(k)}$ of tensile modulus $E_{1(k)}$ to tensile modulus $E_{2(k)}$ is more than 1 and up to 10, and the ratio $t_{1(k)}/t_{2(k)}$ of thickness $t_{1(k)}$ to thickness $t_{2(k)}$ is 0.1 or more and up to 1. Such relationship in tensile modulus and thickness are established between the kth layer of the first composition and the other adjacent layer of the second composition (a layer of the second composition opposite to the kth layer of the first composition), i.e., between the kth layer of the first composition and the k+1th layer of the second composition, and if the tensile modulus and thickness of the k+1th layer of the second composition are respectively represented as $E_{2(k+1)}$ and $t_{2(k+1)}$, the ratio $E_{1(k)}/E_{2(k+1)}$ of tensile modulus $E_{1(k)}$ to tensile modulus $E_{2(k+1)}$ is more than 1 and up to 10, and the ratio $t_{1(k)}/t_{2(k+1)}$ of thickness $t_{1(k)}$ to thickness $t_{2(k+1)}$ is 0.1 or more and up to 1. When the laminate of the present invention is comprised of n layers of the first composition and n+1 layers of the second composition, although all of the n layers of the first composition may have the same tensile modulus and thickness and all of the n+1 layers of the second composition may have the same tensile modulus and thickness, n layers of the first composition may have any tensile modulus and thickness and n+1 layers of the second composition may have any tensile modulus and thickness, provided that, in any adjacent pair of a layer of the first composition and a layer of the second composition, the ratio of the tensile modulus of the first composition to the tensile modulus of the second composition and the ratio of the thickness of the layer of the first composition to the layer of the second composition satisfy the above conditions. In view of productivity of the laminate, it is preferred that all of the n layers of the first composition have the same tensile modulus and thickness, and all of the n+1 layers of the second composition have the same tensile modulus and thickness. When the ratio of the tensile modulus of the first composition to the tensile modulus of the second composition and the ratio of the thickness of the first composition to the thickness of the second composition satisfy the above conditions, the stress applied to the EVOH-containing layer is relieved, and consequently, it is possible to prevent cracks from occurring in the EVOH layer or layers, and thereby result in improved fatigue durability against mechanical stresses such as elongation and flexure.

The laminate of the present invention may be comprised of any thermoplastic resin composition, provided that the thermoplastic resin composition which constitutes the layer or layers of the first composition, i.e., the first thermoplastic resin composition, comprises at least one thermoplastic resin selected from the group consisting of ethylene-vinyl alcohol copolymer and modified ethylene-vinyl alcohol copolymers, and that the layer or layers of the first composition and the layers of the second composition which constitute the laminate satisfy the conditions for tensile modulus and thickness as described above.

At least one member (hereinafter also referred to as "component (1-a)") selected from the group consisting of ethylene-vinylalcohol copolymer (EVOH) and modified ethylene-vinylalcohol copolymer (modified EVOH), which constitutes the first thermoplastic resin composition, is preferably an EVOH and/or modified EVOH having an ethylene content of 25 to 50 mol % and a saponification degree of 90% or more. An ethylene content of less than 25 mol % may result in poor fatigue durability and moldability, and an ethylene content of more than 50 mol % or a saponification degree of less than 90% may result in poor barrier properties as an air permeation prevention layer. EVOH can be prepared by a well-known method, for example, by polymerizing ethylene and vinyl acetate to prepare ethylene-vinyl acetate copolymer (EVA), and hydrolyzing the resulting EVA. Examples of commercially available EVOH resins that can be used in the present invention include, for example, Soarnol H4815B, A4412, E3808, D2908, and V2504 (all from The Nippon Synthetic Chemical Industries Co. Ltd.), and L171B, F171B, H171B, and E171B (all from Kuraray Co., Ltd.). Modified EVOH can also be prepared by a well-known method, for example, by reacting EVOH with an epoxy compound (for example, glycidol, epoxypropane, etc.) in a solvent using a catalyst, as described in Japanese Unexamined Patent Publication (JP-A) No. 2008-24217.

The first thermoplastic resin composition may optionally comprise component (1-a) as well as one or more other thermoplastic resin (hereinafter also referred to as "component (1-b)"). Examples of such a thermoplastic resin include, polyamide-based resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/12 (N6/12), Nylon 6/66/610 copolymer (N6/66/610), Nylon MXD6, Nylon 6T, Nylon 6/6T copolymer, Nylon 66/PP copolymer, Nylon 66/PPS copolymer), polyester-based resins (for example, aromatic polyesters such as polybutylene terephthalate (PBT), polyethylene terephthalate (PET), polyethylene isophthalate (PEI), PET/PEI copolymer, polyarylate (PAR), polybutylene naphthalate (PBN), liquid crystal polyesters, polybutylene terephthalate/tetraethyleneglycol copolymer, polyoxyalkylenediimide diacid/polybutylene terephthalate copolymer), polynitrile-based resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(meth)acrylate-based resins (for example, polymethyl methacrylate (PMMA), polyethyl methacrylate), polyvinyl-based resins other than EVOH (for example, vinyl acetate, polyvinyl alcohol (PVA), polyvinylidene chloride (PVDC), polyvinyl chloride (PVC), vinyl chloride/vinylidene chloride copolymer, vinylidene chloride/methyl acrylate copolymer), cellulosic resins (for example, cellulose acetate, cellulose acetate butyrate), fluororesins (for example, polyvinylidene fluoride (PVDF), polyvinyl fluoride (PVF), polychlorofluoroethylene (PCTFE), tetrafluoroethylene/ethylene copolymer (ETFE)), and imide-based resins (for example, aromatic polyimides). Polyamide-based resins, polyvinyl alcohol, and ethylene-vinyl alcohol copolymer are preferred as the thermoplastic resins, in view of gas barrier properties, mechanical physical properties, etc. In addition, Nylon 11, Nylon 12, Nylon 6, Nylon 66, Nylon 6/66 copolymer, Nylon 6/12 copolymer, Nylon MXD6, and combinations thereof are preferred as the polyamide-based resins, in view of the balance between gas barrier properties and mechanical physical properties. When the first thermoplastic resin composition comprises component (1-b), the amount of component (1-b) is preferably 5 to 50 parts by weight, and more preferably 25 to 45 parts by weight, with respect to 100 parts by weight of component (1-a).

Moreover, in view of the improvement in fatigue durability, the first thermoplastic resin composition preferably comprises an acid anhydride-modified ethylene-α-olefin copolymer (hereinafter referred to as "component (1-c)"), such as a product obtained by modifying an ethylene-α-olefin copolymer, such as ethylene-propylene copolymer, ethylene-butene copolymer, ethylene-hexene copolymer, ethylene-octene copolymer, etc., with an acid anhydride such as maleic anhydride. Examples of the acid anhydride-modified ethylene-α-olefin copolymers that can be used in the present invention include TAFMER MP0620, MP0610 (both of them are maleic anhydride-modified ethylene-propylene copolymer), MH7020, and MH7010 (maleic anhydride-modified ethylene-butene copolymer). When the first thermoplastic resin composition comprises component (1-c), the amount of component (1-c) is preferably 50 to 300 parts by weight, and more preferably 80 to 250 parts by weight, with respect to 100 parts by weight of component (1-a).

Preferably, the thermoplastic resin composition(s) which constitutes the layers of the second composition, i.e., the second thermoplastic resin composition comprises at least one thermoplastic resin (hereinafter referred to as "component (2-a)") selected from the group consisting of polyamide-based resins, polyvinyl alcohol, ethylene-vinyl alcohol copolymer, and modified ethylene-vinyl alcohol copolymers, in order to establish an affinity and the desired tensile modulus ratio with the first thermoplastic resin composition and in view of fatigue durability, heat resistance, processability, etc. Examples of the polyamide-based resins which may be included in the second thermoplastic resin composition include those illustrated for component (1-b). As the polyamide-based resins which may be included in the second thermoplastic resin composition as component (2-a), Nylon 11, Nylon 12, Nylon 6, Nylon 66, Nylon 6/66 copolymer, Nylon 6/12 copolymer, and Nylon MXD6 are more preferable, in order to establish an affinity and the desired tensile modulus ratio with the first thermoplastic resin composition and in view of fatigue durability, heat resistance, processability, etc. The polyvinyl alcohol which may be included as component (2-a) in the second thermoplastic resin composition preferably has a saponification degree of 80% or more, and preferably of 90% or more. A saponification degree of less than 80% may decreases the thermal stability during molding, and thereby producing the acetic acid odor and generating granular structures and gels in the resulting molded products. Ethylene-vinyl alcohol copolymer and modified ethylene-vinyl alcohol copolymers which may be included as component (2-a) in the second thermoplastic resin composition may be those described for component (1-a).

The second thermoplastic resin composition is preferably one which comprises thermoplastic resin (2-a) as a continuous phase and an elastomer component (hereinafter also referred to as "component (2-b)") dispersed as a disperse phase (discontinuous phase) in the continuous phase. Such a composition is known in this art as a thermoplastic elastomer. The elastomer component which constitutes the disperse phase is preferably a halogenated isoolefin-paraalkylstyrene copolymer rubber, in view of the affinity with thermoplastic resin (2-a), fatigue durability, and the thermal stability during processing. Halogenated isoolefin-paraalkylstyrene copolymer rubbers can be prepared by the halogenation of the copolymers of isoolefin and paraalkylstyrene. The mixing ratio of the isoolefin and paraalkylstyrene, polymerization degree, average molecular weight, polymeric configuration (such as block copolymer, random copolymer), viscosity, the type of the substituted halogen atom, etc., are not particularly limited, and can be selected by a person with ordinary skill in the art depending on the physical properties required for the second thermoplastic resin composition. Examples of the isoolefin which constitutes component (2-b) include isobutylene, isopentene, isohexene, etc., and isobutylene is preferred as the isoolefin. Examples of the paraalkylstyrene which constitutes component (2-b) include paramethylstyrene, paraethylstyrene, parapropylstyrene, parabutylstyrene, etc., and paramethylstyrene is preferred as the paraalkylstyrene. Examples of the halogen which constitutes component (2-b) include fluorine, chlorine, bromine, and iodine, and bromine is preferred as the halogen. Particularly preferred halogenated isoolefin-paraalkylstyrene copolymer rubber is brominated isobutylene-paramethylstyrene copolymer rubber. Brominated isobutyrene-paramethylstyrene copolymer rubber is available from ExxonMobil Chemical Company under the trade name of Exxpro™. When the second thermoplastic resin composition comprises component (2-b), the amount of component (2-b) is preferably 50 to 250 parts by weight, and more preferably 100 to 200 parts by weight, with respect to 100 parts by weight of component (2-a). If the amount of component (2-b) is too low, the layers of the second composition will have insufficient fatigue durability, and conversely, if the amount of component (2-b) is too high, the second composition will have decreased flowing properties in a molten state, and thereby will have insufficient processability.

The halogenated isoolefin-paraalkylstyrene copolymer rubber (component (2-b)) is preferably dynamically crosslinked. By the dynamic crosslinking, the phase structure in which an elastomer component is dispersed in a thermoplastic resin which forms a continuous phase can be fixed, and thereby the fatigue durability and processability can be improved. Dynamic crosslinking can be carried out by melt-kneading components (2-a) and (2-b) at a temperature which is equal to or more that the melting point of polyamide-based resin (2-a), preferably in the presence of a crosslinking agent.

The type and amount of the crosslinking agent used in the second thermoplastic resin composition can be selected by a person with ordinary skill in the art, depending on the dynamic crosslinking conditions. Examples of the crosslinking agent include zinc oxide, stearic acid, zinc stearate, magnesium oxide, m-phenylenebismaleimide, alkylphenol resins and halogenated products thereof, secondary amines, for example, N-(1,3-dimethylbutyl)-N'-phenyl-p-phenylenediamine, etc. Among these, zinc oxide, stearic acid, zinc stearate, N-(1,3-dimethylbutyl)-N'-phenyl-p-phenylenediamine are preferably used as the crosslinking agent for dynamic crosslinking. The crosslinking agent preferably contains zinc oxide. The amount of the crosslinking agent is typically 0.1 to 12 parts by weight, and more preferably 1 to 9 parts by weight, with respect to 100 parts by weight of halogenated isoolefin-paaalkylstyrene copolymer (2-b). If the amount of the crosslinking agent is too low, dynamic crosslinking become insufficient, and it is not able to maintain fine dispersion of halogenated isoolefin-paraalkylstyrene copolymer (2-b), and thereby causes decrease in fatigue durability. Conversely, if the crosslinking agent is too high it may cause scorching during kneading or processing, or may cause defects such as fish-eye when processed into a layer.

To improve the compatibility of halogenated isoolefin-paraalkylstyrene copolymer rubber (2-b) to polyamide-based resin (2-a), for example, acid anhydride-modified olefin copolymers (such as, for example, maleic anhydride-modified ethylene-unsaturated carboxylic acid copolymers such as maleic anhydride-modified ethylene-ethyl acrylate copolymer; maleic anhydride-modified ethylene-α-olefin copolymers such as maleic anhydride-modified ethylene-propylene copolymer, maleic anhydride-modified ethylene-butene-1 copolymer, maleic anhydride-ethylene-hexene-1 copolymer, maleic anhydride-modified ethylene-octene-1 copolymer) and acid anhydride-modified styrene-olefin copolymers (such as, for example, maleic anhydride-modified styrene-ethylene-butylene copolymer) as a compatibilizing agent may be pre-mixed or kneaded with polyamide-based resin (2-a) and/or halogenated isoolefin-paraalkylstyrene copolymer rubber (2-b) prior to the melt-mixing of polyamide-based resin (2-a) and halogenated isoolefin-paraalkylstyrene copolymer rubber (2-b), or may be added during melt-kneading of components (2-a) and (2-b). The amount of such a compatibilizing agent is not particularly limited, and is typically 5 to 50% by weight based on the total weight of halogenated isoolefin-paraalkylstyrene copolymer rubber (2-b).

In addition to the above components, various additives, such as plasticizers, processing aids, antioxidants, coloring agents, etc., which are commonly added to thermoplastic resins may be added to the first thermoplastic resin composition which constitutes the layer or layers of the first composition and the second thermoplastic resin composition which constitutes the layers of the second composition. These additives may be used in conventional amounts, in so far as the object of the present invention is not diminished. When the second thermoplastic resin composition which constitutes the layers of the second composition comprises halogenated isoolefin-paraalkylstyrene copolymer rubber (2-b), various additives, such as reinforcing agents (fillers), vulcanizing agents or crosslinking agents, vulcanization accelerators or crosslinking accelerators, various oils, antioxidants, plasticizers, etc., which are commonly added to the rubber compositions for tires or other applications may be added thereto. The rubber additives may be used in conventional amounts, in so far as the object of the present invention is not diminished.

For example, plasticizers may be added to the first and second thermoplastic resin compositions to improve the processability (kneadability, moldability, etc.). The types and amounts of the plasticizers which may be added to the first thermoplastic resin composition can be suitably selected by a person with ordinary skill in the art, depending on the type and amount of component (1-a), and if present, the types and amounts of components (1-b) and (1-c). Similarly, the types and amounts of the plasticizers which may be added to the second thermoplastic resin composition can be suitably selected by a person with ordinary skill in the art, depending on the type and amount of component (2-a), and if present, the type and amount of component (2-b). Preferred examples of the plasticizers which may be added to the first and second thermoplastic resin compositions include polyhydric alcohols (ethyleneglycol, diethyleneglycol, glycerin, hexanediol, pentaerythritol, xylol, sorbitol, etc.), esters of polyhydric alcohols (glycerine triacetate, etc.), amide compounds (N-butylbenzenesulfoneamide, N-methylpyrrolidone, etc.), alkyleneoxides (ethylene oxide, propylene oxide, etc.), benzoic esters (octyl paraoxybenzoate, 2-ethylhexyl paraoxybenzoate, etc.), phthalic esters (dimethyl phthalate, dioctyl phthalate, etc.), phosphoric esters (triphenyl phosphate, etc.), and modified urethane prepolymers (those having a weight average molecular weight of about 400 to 2000). The first thermoplastic resin composition may contain a plasticizer in an amount typically of 0.5 to 50% by weight, and preferably 1 to 10% by weight, based on the total weight of the first thermoplastic resin composition. The second thermoplastic resin composition may contain a plasticizer in an amount typically of 0.5 to 50% by weight, and preferably 5 to 20% by weight, based on the total weight of the second thermoplastic resin composition.

The first and second thermoplastic resin compositions each can be prepared by melt-kneading the above essential components and optional additives using a kneading machine, such as a kneader, Banbury mixer, single screw kneading extruder, twin-screw kneading extruder, etc., commonly used in the preparation of thermoplastic resin compositions. Melt-kneading is preferably carried out by using a twin-screw kneading extruder, in view of its high productivity. Although the kneading conditions depend on the types and amounts of the essential components and optional additives used, the lower limit of the melt-kneading temperature should be equal to or more than the melting temperature of component (1-a), and the melting temperatures of components (1-b) and (1-c) if used, and should be 20° C. higher than the melting temperature of component (1-a), and the melting temperatures of components (1-b) and (1-c) if used. The melt-kneading temperature is typically from about 180° C. to about 300° C., and preferably from about 190° C. to about 260° C. The melt-kneading time (residence time) is typically from about 30 seconds to about 10 minutes, and preferably from about 1 minute to about 5 minutes.

The laminate of the present invention can be formed by molding the first and second thermoplastic resin compositions using a well-known method in the art for forming a multi-layered laminate from thermoplastic resin compositions. For example, the laminate of the present invention can be obtained by, for example, coextruding the melt-kneaded mixture obtained by melt-kneading the essential components and optional components of the first thermoplastic resin composition and the melt-kneaded mixture of the essential components and the optional components of the second thermoplastic resin composition into respective desired thicknesses by a conventional coextrusion method, for example, from the coextrusion die attached to the outlet port of a twin-screw kneading extruder. Alternatively, the laminate of the present invention can be obtained by, for example, separately extruding the first and second thermoplastic resin compositions into a strand form, pelletizing the strands with a resin pelletizer, and subsequently molding the resulting pellets into a laminate having a desired shape, such as in the form of multi-layered film, tube, etc., and a desired thickness, and comprising a plurality of layers each having a desired thickness, by a multi-layer molding method such as multi-layer inflation molding method. The laminate of the present invention can also be obtained by laminating the first thermoplastic resin composition and the second thermoplastic resin composition by a well-known method such as coextrusion, inflation molding, blow molding, etc. Optionally, an adhesive layer or rubber layer may be applied to the adhesion surface of the outermost layer (a layer of the second thermoplastic resin composition) of the laminate to adhere the laminate to an adherend such as tire members.

Adhesives which can be used in adhering the laminate of the present invention to an adherend include, for example, any adhesives (such as those described in Japanese Unexamined Patent Publication (JP-A) Nos. 2005-68173 and 2005-212452) that are conventionally used for thermoplastic compositions, comprising a modified styrene copolymer, such as styrene-ethylene-propylene copolymer (SEP), styrene-ethylene-butadiene-styrene copolymer (SEBS), styrene-ethylene-butadiene copolymer (SEB), styrene-butadiene-styrene copolymer (SBS), styrene-isoprene-styrene copolymer (SIS)), having a functional group such as epoxy group, hydroxyl group, amino group, carboxyl group, acid anhydride group, etc., as well as a vulcanization accelerator, a vulcanizing agent, a tackifier, etc., and the application method and amount may be conventional. The adhesive layer can be provided on the adhesion surface of the outermost layer of the laminate by, for example, laminating the first thermoplastic resin composition, the second thermoplastic resin composition, and an adhesive which will form an adhesive layer by a well-known method such as coextrusion, inflation molding, blow molding, etc. Alternatively, a solvent solution of an adhesive may be applied to the adhesion surface of the laminate of the present invention.

The rubber layer which can be used in adhering the laminate of the present invention to an adherend, can be formed from a rubber composition comprising at least one rubber component selected from the group consisting of natural rubber (NR), isoprene rubber (IR), butadiene rubber (BR), halogenated butyl rubber (for example brominated butyl rubber (Br-IIR)), chlorinated butyl rubber (Cl-IIR), ethylene-propylene copolymer rubber (EPDM), and styrene-based elastomers (for example, styrene-butadiene rubber (SBR), styrene-butadiene-styrene rubber (SBS), styrene-isoprene-styrene copolymer (SIS), etc. Various additives, such as carbon black, silica, and other reinforcing agents (fillers), vulcanizing or crosslinking agents, vulcanization or crosslinking accelerators, various oils, antioxidants, plasticizers, etc., which are commonly added to the rubber compositions for tires or other applications may be added to the rubber composition for forming the rubber layer, and these additives may be kneaded into a composition by a common technique, and may be used in the vulcanization or crosslinking. The additives may be used in conventional amounts, in so far as the object of the present invention is not diminished.

Although the layer or layers of the first composition and the layers of the second composition which constitute the laminate of the present invention may have any thicknesses, provided that they satisfy the requirements of the tensile modulus and thickness as described above, the thickness of the layer or layers of the first composition is typically 1 to 100 µm, and preferably 5 to 50 µm, and the thickness of the layers of the second composition is typically 5 µm or more and less than 500 µm, and preferably 10 to 300 µm. When the layer or layers of the first composition and the layers of the second composition have thicknesses within such a range, it is possible to achieve both excellent gas permeation preventing properties and durability. If the layer or layers of the first composition and the layers of the second composition are too thin, it is not able to achieve sufficient gas permeation preventing properties, and conversely, if the layer or layers of the first composition and the layers of the second composition are too thick, it results in the decrease in extensional fatigue resistance and flex fatigue resistance and the increase in total weight.

Preferably, at least one of the layers which constitute the laminate of the preset invention has an air permeation coefficient of $2.0 \times 10^{-12}$ cc·cm/cm²·sec·cmHg as measured in accordance with JIS K7126-1 (differential pressure method) at a temperature of 30° C. The presence of a layer having such an air permeation coefficient allows the laminate to exhibit sufficient air pressure retaining properties. An air permeation coefficient of "$1 \times 10^{-12}$ cc·cm/cm²·sec·cmHg" can be converted to "$75.2 \times 10^{-9}$=³·mm/mm²·sec·MPa" in SI unit system.

At least one, and preferably all of the layers of the first thermoplastic resin composition has a tensile modulus of 2000 MPa or less, and more preferably 200 MPa to 2000 MPa, as measured in accordance with JIS K6251 at a temperature of 25° C. The tensile modulus over 2000 MPa might result in the decrease in extensional fatigue resistance and flex fatigue resistance, and therefore is not preferred.

The laminate of the present invention can be used in various applications, for example, applications which require gas permeation prevention properties and durability, such as tires, hoses, ship fenders, rubber backs, fuel tanks, etc. The laminate of the present invention exhibits excellent gas permeation preventing properties as well as excellent durability, and therefore is particularly suitable for the applications such as pneumatic tire inner liners, hoses, etc.

Any conventional method may be used for manufacturing a pneumatic tire in which the laminate of the present invention is used in an inner liner. For example, after obtaining a laminate according to the present invention having a predetermined width and thickness, the laminate is applied onto a tire molding drum in cylindrical form, tire members such as a carcass layer, a belt layer, a tread layer, etc., are sequentially laminated thereon, and the resulting green tire is removed from the tire molding drum. Then, the green tire is vulcanized in accordance with a conventional procedure to manufacture a desired pneumatic tire in which a laminate according to the present invention is used in an inner liner.

EXAMPLES

The present invention will be further explained by referring to the following examples and comparative examples, and it should be understood that the scope of the present invention is not limited to these examples.

Preparations of Thermoplastic Resin Compositions A1 to A3

The starting materials shown in Table 1 were charged into a twin-screw kneading extruder (TEX44 manufactured by The Japan Steel Works, Ltd.), and were kneaded at a temperature of 230° C. and a residence time of 3 minutes. The resulting kneaded mixture was continuously extruded into the form of a strand from the extruder, and the resulting extrudate in the form of a strand was cut with a water-cooling cutter to obtain pellets of thermoplastic resin compositions A1 to A3.

Preparations of Thermoplastic Resin Compositions B1 and B2

Among the starting materials shown in Table 2, the rubber and crosslinking agent (zinc oxide, stearic acid, and zinc stearate) were mixed at 100° C. for 2 minutes with a closed-type Banbury mixer (manufactured by Kobe Steel Ltd.) to prepare a rubber compound, and the rubber compound was processed into pellets by a rubber pelletizer (manufactured by Moriyama Co., Ltd.). Separately, a resin (Nylon 6/66 copolymer or Nylon 6/12 copolymer) and a plasticizer were kneaded at 250° C. for 3 minutes with a twin-screw kneading extruder (manufactured by The Japan Steel Works, Ltd.), and were pelletized, and the pellets of the resulting resin composition, the pellets of the rubber compound, and a modified polyolefin were kneaded at 250° C. for 3 minutes with a twin-screw kneading extruder (manufactured by The Japan Steel Works, Ltd.). The resulting kneaded mixture was continuously extruded into the form of a strand from the extruder, and the resulting extrudate in the form of a strand was cut with a water-cooling cutter to obtain pellets of thermoplastic resin compositions B1 and B2.

Preparation of Adhesive Composition C

The pellets of each starting material shown in Table 3 were charged into a twin-screw kneading extruder (TEX44 manufactured by The Japan Steel Works, Ltd.), and were mixed at 120° C. for 3 minutes. The resulting kneaded mixture was continuously extruded into the form of a strand from the extruder, and the resulting extrudate in the form of a strand was cut with a water-cooling cutter to obtain pellets of thermoplastic resin composition C.

Preparation of Rubber Composition

The starting materials shown in Table 4 were charged into a closed-type Banbury mixer (manufactured by Kobe Steel Ltd.) and were mixed at 60° C. for 3 minutes.

TABLE 1

Formulations of Thermoplastic Resin Compositions A1 to A3 (parts by weight)

| Starting Materials | Composition A1 | Composition A2 | Composition A3 |
|---|---|---|---|
| EVOH[*1] | 42 | 42 | 70 |
| Nylon 6[*2] | 5 | 5 | 8.3 |
| Nylon 6/66 copolymer[*3] | 13 | 13 | 21.7 |
| Maleic anhydride-modified ethylene-α-olefin copolymer[*4] | 40 | 40 | — |
| Plasticizer[*5] | — | 6 | — |
| Total | 100 | 106 | 100 |

Footnote:
[*1] Soarnol H4815B manufactured by The Nippon Synthetic Chemical Industries Co., Ltd. (ethylene content: 48 mol %, saponification degree: 99% or more)
[*2] UBE Nylon 1030B manufactured by Ube Industries, Ltd.
[*3] UBE Nylon 5033B manufactured by Ube Industries, Ltd.
[*4] Maleic anhydride-modified ethylene-propylene copolymer (Tafmer MP-0620 manufactured by Mitsui Chemicals Inc.)
[*5] N-butylbenzenesulfoneamide (BM-4 manufactured by Daihachi Chemical Industry Co., Ltd.)

TABLE 2

Formulations of Thermoplastic Resin Compositions B1 and B2 (parts by weight)

| Starting Materials | Composition B1 | Composition B2 |
|---|---|---|
| Rubber[*1] | 100 | 100 |
| Zinc oxide[*2] | 0.15 | 0.15 |
| Stearic acid[*3] | 0.60 | 0.60 |
| Zinc stearate[*4] | 0.30 | 0.30 |
| Nylon 6/66 copolymer[*5] | 63 | — |
| Nylon 6/12 copolymer[*6] | — | 63 |
| Plasticizer[*7] | 15 | 27 |
| Compatibilizing agent[*8] | 10 | 10 |
| Total (parts by weight) | 189.05 | 201.05 |

Footnote:
[*1] Brominated isobutylene-paramethylstyrene copolymer rubber (Exxpro MDX89-4 manufactured by ExxonMobile Chemical Company)
[*2] Zinc oxide of JIS grade 3 manufactured by Seido Chemical Industry Co., Ltd.
[*3] Beads Stearic Acid manufactured by Nippon Oil & Fat Co., Ltd.
[*4] Zinc stearate manufactured by Sakai Chemical Industry Co., Ltd.
[*5] UBE Nylon 5033B manufactured by Ube Industries, Ltd.
[*6] Zytel 151L manufactured by DuPont
[*7] N-butylbenzenesulfoneamide (BM-4 manufactured by Daihachi Chemical Industry Co., Ltd.)
[*8] Maleic anhydride-modified ethylene-ethyl acrylate copolymer (HPR AR201 manufactured by Mitsui-DuPont Polychemicals Co., Ltd.)

TABLE 3

Formulation of Adhesive Composition

| Starting Materials | Amounts (parts by weight) |
|---|---|
| Epoxidized SBS[*1] | 100 |
| Zinc oxide[*2] | 5 |
| Stearic acid[*3] | 1 |
| Vulcanization accelerator[*4] | 3 |
| Tackifier[*5] | 30 |
| Total (parts by weight) | 139 |

Footnote:
[*1] Epoxidized styrene-butadiene block copolymer (Epofriend AT501 manufactured by Daicel Chemical Industries Ltd.)
[*2] Zinc oxide of JIS grade 3 manufactured by Seido Chemical Industry Co., Ltd.
[*3] Beads Stearic Acid YR manufactured by Nippon Oil & Fat Co., Ltd.
[*4] Nocceler TOT-N manufactured by Ouchi Shinko Chemical Industrial Co., Ltd.
[*5] YS Resin D105 manufactured by Yasuhara Chemical Co., Ltd.

TABLE 4

| Formulation of Rubber Composition | |
|---|---|
| Starting Materials | Amounts (parts by weight) |
| Natural Rubber*[1] | 50 |
| SBR*[2] | 50 |
| Carbon black*[3] | 50 |
| Zinc oxide*[4] | 3 |
| Stearic acid*[5] | 2 |
| Oil*[6] | 10 |
| Wax*[7] | 1 |
| Sulfur*[8] | 2 |
| Vulcanization accelerator*[9] | 1 |
| Antioxidant*[10] | 1 |
| Resin Crosslinking Agent*[11] | 5 |
| Total (parts by weight) | 175 |

Footnote:
*[1]TSR 20 manufactured by NUSIRA
*[2]Nipol 1502 manufactured by Nippon Zeon Co., Ltd.
*[3]DIABLACK G manufactured by Mitsubishi Chemical Co., Ltd.
*[4]Zinc oxide of JIS grade 3 manufactured by Seido Chemical Industry Co., Ltd.
*[5]Beads Stearic Acid YR manufactured by Nippon Oil & Fat Co., Ltd.
*[6]Extract No. 4S manufactured by Showa Shell Petroleum Co., Ltd.
*[7]Sunnoc manufactured by Ouchi Shinko Chemical Industrial Co., Ltd.
*[8]Oil-treated sulfur manufactured by Hosoi Chemical Industry Co., Ltd.
*[9]Nocceler CZ-G manufactured by Ouchi Shinko Chemical Industrial Co., Ltd.
*[10]Nocrac 224 manufactured by Ouchi Shinko Chemical Industrial Co., Ltd.
*[11]Tackirol 250-I manufactured by Taoka Chemical Industry Co., Ltd.

Preparation of Thermoplastic Resin Laminate

Example 1

A laminate in the form of a tube was obtained using an inflation molding apparatus (manufactured by Placo Co., Ltd.) by extruding thermoplastic resin composition A1, thermoplastic resin composition B1, and the adhesive composition described above, at 230° C. in the form of a tube so that these compositions stacked in the order of composition B1/composition A1/composition B1/adhesive composition (adhesive composition layer was on the outer side), blowing air into the tube to expand it, folding the tube with pinch rollers, and winding up the tube. In the resulting laminate, the thickness of the thermoplastic resin composition A1 layer was 30 μm, the thickness of the thermoplastic resin composition B1 layer was 100 μm, and the thickness of the adhesive composition layer was 30 μm. In this laminate, the ratio $t_{A1}/t_{B1}$ of the thickness $t_{A1}$ of the thermoplastic resin composition A1 layer to the thickness $t_{B1}$ of the thermoplastic resin composition B1 layer was 0.30.

Example 2

Except that thermoplastic resin compositions A2 and B2 were used in place of thermoplastic resin compositions A1 and B1, inflation molding was carried out in the same manner as in Example 1 to obtain a laminate in the form of a tube in which the compositions being stacked in the order of composition B2/composition A2/composition B2/adhesive composition (adhesive composition layer was on the outer side). In the resulting laminate, the thicknesses of the thermoplastic resin composition A2 layer and the thermoplastic resin composition B2 layer were 50 μm, and the thickness of the adhesive composition layer was 30 μm. In this laminate, the ratio $t_{A2}/t_{B2}$ of the thickness $t_{A2}$ of the thermoplastic resin composition A2 layer to the thickness $t_{B2}$ of the thermoplastic resin composition B2 layer was 1.0.

Example 3

Except that thermoplastic resin compositions A1, thermoplastic resin composition B1, and the adhesive composition were stacked in the order of composition B1/composition A1/composition B1/composition A1/composition B1/adhesive composition (adhesive composition layer was on the outer side), inflation molding was carried out in the same manner as in Example 1 to obtain a laminate in the form of a tube. In the resulting laminate, the thickness of the thermoplastic resin composition A1 layer was 10 μm, the thickness of the thermoplastic resin composition B1 layer was 50 μm, and the thickness of the adhesive composition layer was 30 μm. In this laminate, the ratio $t_{A1}/t_{B1}$ of the thickness $t_{A1}$ of the thermoplastic resin composition A1 layer to the thickness $t_{B1}$ of the thermoplastic resin composition B1 layer was 0.20.

Example 4

Except that thermoplastic resin compositions A2, thermoplastic resin composition B2, and the adhesive composition were stacked in the order of composition B2/composition A2/composition B2/composition A2/composition B2/composition A2/composition B2/adhesive composition (adhesive composition layer was on the outer side), inflation molding was carried out in the same manner as in Example 2 to obtain a laminate in the form of a tube. In the resulting laminate, the thickness of the thermoplastic resin composition A2 layer was 10 μm, the thickness of the thermoplastic resin composition B2 layer was 25 μm, and the thickness of the adhesive composition layer was 30 μm. In this laminate, the ratio $t_{A2}/t_{B2}$ of the thickness $t_{A2}$ of the thermoplastic resin composition A2 layer to the thickness $t_{B2}$ of the thermoplastic resin composition B2 layer was 0.40.

Example 5

Except that thermoplastic resin compositions A3 and B2 were used in place of thermoplastic resin compositions A1 and B1, inflation molding was carried out in the same manner as in Example 1 to obtain a laminate in the form of a tube in which the compositions being stacked in the order of composition B2/composition A3/composition B2/adhesive composition (adhesive composition layer was on the outer side). In the resulting laminate, the thicknesses of the thermoplastic resin composition A3 layer was 5 μm, the thickness of the thermoplastic resin composition B2 layer was 50 μm, and the thickness of the adhesive composition layer was 30 μm. In this laminate, the ratio $t_{A3}/t_{B2}$ of the thickness $t_{A3}$ of the thermoplastic resin composition A3 layer to the thickness $t_{B2}$ of the thermoplastic resin composition B2 layer was 0.10.

Example 6

A laminate in the form of a tube was obtained using an inflation molding apparatus (manufactured by Placo Co., Ltd.) by extruding thermoplastic resin composition A1 and thermoplastic resin composition B1 at 230° C. in the form of tube so that the compositions being stacked in the order of composition B1/composition A1/composition B1, blowing air into the tube to expand it, folding the tube with pinch rollers, and winding up the tube. In the resulting laminate, the thickness of the thermoplastic resin composition A1 layer was 30 μm, and the thickness of the thermoplastic resin composition B1 layer was 200 μm. Then, a 10 wt % solution of the above adhesive composition in toluene was prepared, and was brush-coated (dry coating thickness of 15 μm) to one side surface of the laminate of composition B1/composition A1/composition B1 (i.e., the surface of one of the two composition B1 layers) to obtain a laminate having on one side surface a layer of the adhesive composition. In this laminate, the ratio $t_{A1}/t_{B1}$ of the thickness $t_{A1}$ of the thermoplastic resin composition A1 layer to the thickness $t_{B1}$ of the thermoplastic resin composition B1 layer was 0.15.

Example 7

A laminate in the form of a tube was obtained by inflation molding thermoplastic resin composition A1 and thermoplastic resin composition B1 as in Example 6. In the resulting laminate, the thickness of thermoplastic resin composition A1 layer was 30 μm, and the thickness of the thermoplastic resin composition B1 layer was 100 μm. Then, the above adhesive composition was shaped into the form of sheet having a thickness of 1 mm, and the resulting sheet was applied to one side surface of the laminate to obtain a laminate having on one side surface the rubber composition layer. In this laminate, the ratio $t_{A1}/t_{B1}$ of the thickness $t_{A1}$ of the thermoplastic resin composition A1 layer to the thickness $t_{B1}$ of the thermoplastic resin composition B1 layer was 0.30.

Comparative Example 1

Except that the thicknesses of the thermoplastic resin composition A1 layer and the thermoplastic resin composition B1 layer were varied, inflation molding was carried out in the same manner as in Example 1 to obtain a laminate in the form of a tube. In the resulting laminate, the thicknesses of the thermoplastic resin composition A1 layer was 50 μm, the thickness of the thermoplastic resin composition B1 layer was 10 μm, and the thickness of the adhesive composition layer was 30 μm. In this laminate, the ratio $t_{A1}/t_{B1}$ of the thickness $t_{A1}$ of the thermoplastic resin composition A1 layer to the thickness $t_{B1}$ of the thermoplastic resin composition B1 layer was 5.0.

Comparative Example 2

Except that the thicknesses of the thermoplastic resin composition A1 layer and the thermoplastic resin composition B1 layer were varied, inflation molding was carried out in the same manner as in Example 1 to obtain a laminate in the form of a tube. In the resulting laminate, the thicknesses of the thermoplastic resin composition A1 layer was 30 μm, the thickness of the thermoplastic resin composition B1 layer was 500 μm, and the thickness of the adhesive composition layer was 30 μm. In this laminate, the ratio $t_{A1}/t_{B1}$ of the thickness $t_{A1}$ of the thermoplastic resin composition A1 layer to the thickness $t_{B1}$ of the thermoplastic resin composition B1 layer was 0.06.

The laminates of Examples 1 to 7 and Comparative Examples 1 to 2 obtained as described above were evaluated by the following tests.

Test Methods (1) Tensile Modulus

Each of thermoplastic resin compositions A1 to A3 and B1 to B2 was shaped into a sheet having a thickness of 1.0 mm, and a JIS No. 3 dumbbell-shaped specimen was prepared and measured for tensile modulus (MPa) from the slope in the initial linear region of the stress-strain curve measured under the conditions of a temperature of 25° C. and an elongation rate of 500 mm/min., in accordance with JIS K6251. In addition, for the laminates of Examples 1 to 7 and Comparative Examples 1 to 2, the ratio of the tensile modulus ($E_{A1}$, $E_{A2}$, or $E_{A3}$) of thermoplastic resin composition A1, A2, or A3, to the tensile modulus ($E_{B1}$ or $E_{B2}$) of thermoplastic resin compositions B1 or B2, of each laminate was determined (for example, in the case of the laminate of Example 1, the ratio $E_{A1}/E_{B1}$ of tensile modulus $E_{A1}$ of thermoplastic resin composition A1 to tensile modulus $E_{B1}$ of thermoplastic resin composition B1 was determined).

(2) Air Permeability

Each of thermoplastic resin compositions A1 to A3 and B1 to B2 was shaped into a sheet having a thickness of 0.1 mm, and was measured for air permeation coefficient (cc·cm/cm²·sec·cmHg) in accordance with JIS K7126-1 (differential pressure method) at a temperature of 30° C.

(3) Durability of Laminate in Tire

The laminate was disposed on a tire molding drum so that the adhesive composition layer or rubber composition was positioned on the outer side (opposite side to the drum). Tire members such as a carcass layer, a belt layer, a tread layer, etc., that are used in the production of conventional tires were laminated onto the laminate, and the resulting green tire was removed from the tire molding drum. Then, the green tire was thermally vulcanized in accordance with a conventional method to produce a tire having a size of 195/65 R 15. The resulting tire was equipped on a 1800 cc FF passenger car with a rim of 15×6JJ and an inner pressure of 200 kPa, and the car was run on the actual road for 30,000 km. Subsequently, the tire was removed from the rim, and the laminate disposed on the inner surface of the tire was checked for the presence of cracks, and the durability of the laminate was evaluated by the following standard:

Good: No crack.
Acceptable: Less than 10 cracks.
Not acceptable: 10 or more cracks. (No problem in practical use.)

The results are as shown in Table 5 below.

TABLE 5

| | Test Results | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Comp. Ex. 1 | Comp. Ex. 2 |
| Layer thickness ratio | $t_{A1}/t_{B1}$ = 0.30 | $t_{A2}/t_{B2}$ = 1.0 | $t_{A1}/t_{B1}$ = 0.20 | $t_{A2}/t_{B2}$ = 0.40 | $t_{A3}/t_{B2}$ = 0.10 | $t_{A1}/t_{B1}$ = 0.15 | $t_{A1}/t_{B1}$ = 0.30 | $t_{A1}/t_{B1}$ = 5.0 | $t_{A1}/t_{B1}$ = 0.06 |
| Tensile modulus of thermoplastic resin composition (MPa) | $E_{A1}$: 500 $E_{B1}$: 300 | $E_{A2}$: 300 $E_{B2}$: 200 | $E_{A1}$: 500 $E_{B1}$: 300 | $E_{A2}$: 300 $E_{B2}$: 200 | $E_{A3}$: 2000 $E_{B2}$: 200 | $E_{A1}$: 500 $E_{B1}$: 300 | $E_{A1}$: 500 $E_{B1}$: 300 | $E_{A1}$: 500 $E_{B1}$: 300 | $E_{A1}$: 500 $E_{B1}$: 300 |
| Tensile modulus ratio | $E_{A1}/E_{B1}$ = 1.7 | $E_{A2}/E_{B2}$ = 1.5 | $E_{A1}/E_{B1}$ = 1.7 | $E_{A2}/E_{B2}$ = 1.5 | $E_{A3}/E_{B2}$ = 10.0 | $E_{A1}/E_{B1}$ = 1.7 | $E_{A1}/E_{B1}$ = 1.7 | $E_{A1}/E_{B1}$ = 1.7 | $E_{A1}/E_{B1}$ = 1.7 |
| Air permeability coefficient | A1: 0.3 | A2: 2.0 | A1: 0.3 | A2: 2.0 | A3: 0.01 | A1: 0.3 | A1: 0.3 | A1: 0.3 | A1: 0.3 |

TABLE 5-continued

Test Results

| | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| ($\times 10^{-12}$ cc·cm/cm²·sec·cmHg) | B1: 20 | B2: 28 | B1: 20 | B2: 28 | B2: 28 | B1: 20 | B1: 20 | B1: 20 | B1: 20 |
| Durability of laminate in tire | Good | Acceptable | Good | Good | Acceptable | Good | Good | Not acceptable | Not acceptable |

The test results in Table 5 show that, when a laminate is formed by alternately stacking thermoplastic resin compositions which differ from each other in composition, if the laminate has a layer thickness ratio and tensile modulus ratio with in the scope of the present invention, the laminate exhibits excellent fatigue durability.

INDUSTRIAL APPLICABILITY

The laminate of the present invention has excellent gas permeation preventing properties and fatigue durability, and therefore, for example, it is possible to make the inner liners of pneumatic tires thin, and realize both weight reduction and high air pressure retaining properties of tires. The laminate of the present invention is also useful as a barrier material of rubber laminates which require gas permeation prevention properties and fatigue durability, such as pneumatic tires, as well as hoses, ship fenders, rubber backs, fuel tanks, etc.

The invention claimed is:

1. A pneumatic tire using a laminate comprising at least one layer of a first thermoplastic resin composition alternately stacked with at least two layers of a second thermoplastic resin composition so that the outermost layers are the layers of the second thermoplastic resin composition, wherein the first thermoplastic resin composition comprises at least one selected from the group consisting of ethylene-vinyl alcohol copolymer and modified ethylene-vinyl alcohol copolymers, and the second thermoplastic resin composition has a different composition from the first thermoplastic resin composition and comprises a brominated isoolefin-paraalkylstyrene copolymer rubber, and wherein, in any adjacent pair of the layer of the first thermoplastic resin composition and the layer of the second thermoplastic resin composition, the ratio $E_1/E_2$ is more than 1 and up to 10, and the ratio $t_1/t_2$ is 0.1 or more and up to 1, wherein $E_1$ and $t_1$ are the tensile modulus and thickness of the layer of the first thermoplastic resin composition and $E_2$ and $t_2$ are the tensile modulus and thickness of the layer of the second thermoplastic resin composition, wherein the second thermoplastic resin composition comprises at least one thermoplastic resin selected from the group consisting of polyamide-based resins, polyvinyl alcohol, ethylene-vinyl alcohol copolymer, and modified ethylene-vinyl alcohol copolymers.

2. The pneumatic tire according to claim 1, wherein the first thermoplastic resin composition further comprises at least one thermoplastic resin selected from the group consisting of polyamide-based resins and polyvinyl alcohol.

3. The pneumatic tire according to claim 2, wherein the polyamide-based resins are selected from the group consisting of Nylon 11, Nylon 12, Nylon 6, Nylon 66, Nylon 6/66 copolymer, Nylon 6/12 copolymer, Nylon MXD6, and combinations thereof.

4. The pneumatic tire according to claim 1, wherein the first thermoplastic resin composition comprises an acid anhydride-modified ethylene-α-olefin copolymer.

5. The pneumatic tire according to claim 1, wherein at least one layer of the layers constituting the laminate has an air permeation coefficient of $2.0 \times 10^{-12}$ cc·cm/cm²·sec·cmHg or less as measured in accordance with JIS K7126-1 at a temperature of 30° C.

6. The pneumatic tire according to claim 1, wherein all of the layers of the first thermoplastic resin composition have a tensile modulus of 2000 MPa or less as measured in accordance with JIS K6251 at a temperature of 25° C.

7. The pneumatic tire according to claim 1, wherein all of the layers of the second thermoplastic resin composition have a thickness of less than 500 μm.

8. The pneumatic tire according to claim 2, wherein the first thermoplastic resin composition comprises an acid anhydride-modified ethylene-α-olefin copolymer.

9. The pneumatic tire according to claim 3, wherein the first thermoplastic resin composition comprises an acid anhydride-modified ethylene-α-olefin copolymer.

10. The pneumatic tire according to claim 1, wherein the second thermoplastic resin composition is a thermoplastic elastomer comprising at least one thermoplastic resin selected from the group consisting of polyamide-based resins, polyvinyl alcohol, ethylene-vinyl alcohol copolymer, and modified ethylene-vinyl alcohol copolymers as a continuous phase and a brominated isoolefin-paraalkylstyrene copolymer rubber as a disperse phase.

11. The pneumatic tire according to claim 2, wherein the second thermoplastic resin composition is a thermoplastic elastomer comprising at least one thermoplastic resin selected from the group consisting of polyamide-based resins, polyvinyl alcohol, ethylene-vinyl alcohol copolymer, and modified ethylene-vinyl alcohol copolymers as a continuous phase and a brominated isoolefin-paraalkylstyrene copolymer rubber as a disperse phase.

12. The pneumatic tire according to claim 4, wherein the second thermoplastic resin composition is a thermoplastic elastomer comprising at least one thermoplastic resin selected from the group consisting of polyamide-based resins, polyvinyl alcohol, ethylene-vinyl alcohol copolymer, and modified ethylene-vinyl alcohol copolymers as a continuous phase and a brominated isoolefin-paraalkylstyrene copolymer rubber as a disperse phase.

13. The pneumatic tire according to claim 5, wherein the second thermoplastic resin composition is a thermoplastic elastomer comprising at least one thermoplastic resin selected from the group consisting of polyamide-based resins, polyvinyl alcohol, ethylene-vinyl alcohol copolymer, and modified ethylene-vinyl alcohol copolymers as a continuous phase and a brominated isoolefin-paraalkylstyrene copolymer rubber as a disperse phase.

14. The pneumatic tire according to claim 6, wherein the second thermoplastic resin composition is a thermoplastic elastomer comprising at least one thermoplastic resin selected from the group consisting of polyamide-based resins, polyvinyl alcohol, ethylene-vinyl alcohol copolymer, and modified ethylene-vinyl alcohol copolymers as a continuous phase and a brominated isoolefin-paraalkylstyrene copolymer rubber as a disperse phase.

15. The pneumatic tire according to claim 7, wherein the second thermoplastic resin composition is a thermoplastic elastomer comprising at least one thermoplastic resin selected from the group consisting of polyamide-based resins, polyvinyl alcohol, ethylene-vinyl alcohol copolymer, and modified ethylene-vinyl alcohol copolymers as a continuous phase and a brominated isoolefin-paraalkylstyrene copolymer rubber as a disperse phase.

* * * * *